US012810441B2

(12) United States Patent
Nanaumi et al.

(10) Patent No.: US 12,810,441 B2
(45) Date of Patent: Nov. 24, 2026

(54) OBJECT MOTION MEASUREMENT APPARATUS, OBJECT MOTION MEASUREMENT METHOD, AND IMAGING APPARATUS

(71) Applicants: CANON KABUSHIKI KAISHA, Tokyo (JP); CANON MEDICAL SYSTEMS CORPORATION, Tochigi (JP)

(72) Inventors: Ryuichi Nanaumi, Tokyo (JP); Kazuhiko Fukutani, Kanagawa (JP); Kazuya Okamoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 225 days.

(21) Appl. No.: 18/443,422

(22) Filed: Feb. 16, 2024

(65) Prior Publication Data

US 2024/0303829 A1 Sep. 12, 2024

(30) Foreign Application Priority Data

Mar. 9, 2023 (JP) ................................ 2023-036490

(51) Int. Cl.
*G06T 7/246* (2017.01)
*G06T 5/50* (2006.01)
*G06T 5/73* (2024.01)

(52) U.S. Cl.
CPC ................ *G06T 7/246* (2017.01); *G06T 5/50* (2013.01); *G06T 5/73* (2024.01); *G06T 2207/10088* (2013.01); *G06T 2207/20201* (2013.01); *G06T 2207/30004* (2013.01); *G06T 2207/30196* (2013.01); *G06T 2207/30204* (2013.01)

(58) Field of Classification Search
CPC .. G06T 7/246; G06T 5/50; G06T 5/73; G06T 2207/10088; G06T 2207/20201; G06T 2207/30004; G06T 2207/30196; G06T 2207/30204
See application file for complete search history.

(56) References Cited

U.S. PATENT DOCUMENTS

| | | | | |
|---|---|---|---|---|
| 2017/0032538 | A1 | 2/2017 | Ernst | |
| 2022/0349963 | A1 * | 11/2022 | Hajnal .................. | A63F 13/213 |
| 2023/0074624 | A1 | 3/2023 | Nanaumi et al. | |

OTHER PUBLICATIONS

Maclaren, Julian, et al. "Measurement and correction of microscopic head motion during magnetic resonance imaging of the brain." PloS one 7.11 (2012): e48088. (Year: 2012).*

(Continued)

*Primary Examiner* — Amandeep Saini
*Assistant Examiner* — Denise G Alfonso
(74) *Attorney, Agent, or Firm* — Carter, DeLuca & Farrell LLP

(57) ABSTRACT

An object motion measurement apparatus includes an imaging device which images an object; and at least one memory and at least one processor which function as: a body motion acquisition unit configured to acquire information related to a motion of the object from an image imaged by the imaging device; an index acquisition unit configured to acquire from the image imaged by the imaging device an index which reflects vibration of an imaging apparatus, which is different from the imaging device and images the object; and an output unit configured to output the index to the imaging apparatus.

19 Claims, 13 Drawing Sheets

(56) References Cited

OTHER PUBLICATIONS

Foerster, Bernd U., Dardo Tomasi, and Elisabeth C. Caparelli. "Magnetic field shift due to mechanical vibration in functional magnetic resonance imaging." Magnetic Resonance in Medicine: An Official Journal of the International Society for Magnetic Resonance in Medicine 54.5 (2005): 1261-1267. (Year: 2005).*
Andronesi, Ovidiu C., et al. "Motion correction methods for MRS: experts' consensus recommendations." NMR in Biomedicine 34.5 (2021): e4364. (Year: 2021).*
Kochunov, Peter, et al. "Retrospective motion correction protocol for high-resolution anatomical MRI." Human brain mapping 27.12 (2006): 957-962. (Year: 2006).*
Zaitsev, M. et al., "Magnetic resonance imaging of freely moving objects: Prospective real-time motion correction using an external optical motion tracking system" NeuroImage (Apr. 2006) pp. 1038-1050, vol. 31.

* cited by examiner

OBJECT MOTION MEASUREMENT APPARATUS, OBJECT MOTION MEASUREMENT METHOD, AND IMAGING APPARATUS

BACKGROUND OF THE INVENTION

Field of the Invention

The present invention relates to a technique of measuring a motion of an object.

Description of the Related Art

Medical image imaging apparatuses include a Magnetic Resonance Imaging (MRI) apparatus and an X-ray Computed Tomography (CT) apparatus. Furthermore, the medical image imaging apparatuses include a Positron Emission Tomography (PET) apparatus, a Single Photon Emission Computed Tomography (SPECT) apparatus, and a tomosynthesis apparatus.

The magnetic resonance imaging apparatus which is one type of the medical image imaging apparatuses is an apparatus which applies a high Radio Frequency (RF) to an object placed in a static magnetic field, and generates an image of an inside of the object. The magnetic resonance imaging apparatus generates an image of an inside of an object on the basis of a Magnetic Resonance (MR) signal generated from the object due to an influence of an applied RF.

In recent years, higher resolution of images output from magnetic resonance imaging apparatuses has advanced. Due to higher resolution of images, an artifact which used to be relatively inconspicuous comes to strongly appear, and this is a new problem for which improvement is desired. As one of causes which produce such an artifact, a motion of a head in a head coil is known, and an attempt was made to correct gradient magnetic fields of a magnetic resonance imaging apparatus according to the motion of the head measured by a camera (M. Zaitsev, C. Dold, G. Sakas, J. Hennig, and O. Speck, "Magnetic resonance imaging of freely moving objects: Prospective real-time motion correction using an external optical motion tracking system", NeuroImage 31 (2006) 1038-1050).

"Magnetic resonance imaging of freely moving objects: Prospective real-time motion correction using an external optical motion tracking system" discloses a method for attaching a marker to a moving object, photographing the object from an outside, and detecting a motion of an object from a difference in marker position between moving image frames. Furthermore, U.S. Patent Application Publication No. 2017/0032538 discloses a method for discriminating a false motion caused by slide of a motion measurement marker on the skin of an object or the like, thereby correcting an output.

In medical image imaging apparatuses, vibration occurs due to actuators or the like. In a case of, for example, a magnetic resonance imaging apparatus, when a current is caused to flow through gradient magnetic field coils, an interaction with a strong static magnetic field causes the Lorentz force to act, and displaces the gradient magnetic field coils. This displacement transmits to an apparatus housing, whereby the apparatus housing vibrates.

Furthermore, during X-ray computed tomography, an apparatus housing vibrates due to rotation of tubes, a detector, and peripheral equipment. When such a vibration of a housing of a medical image imaging apparatus transmits to a marker through an object, or transmits to a tracking system installed in the medical image imaging apparatus, a motion blur is produced in a marker image captured by a camera. When a motion blur is produced in a marker image, detection accuracy lowers. A false motion discrimination method disclosed in U.S. Patent Application Publication No. 2017/0032538 discriminates a false motion in an object, yet has difficulty in discriminating vibration of a medical image imaging apparatus.

SUMMARY OF THE INVENTION

The present invention has been made with the foregoing situation in view, and provides a technique for reducing an influence of vibration of an apparatus, and accurately measuring a motion of an object.

The present disclosure includes an object motion measurement apparatus comprising: an imaging device which images an object; and at least one memory and at least one processor which function as: a body motion acquisition unit configured to acquire information related to a motion of the object from an image imaged by the imaging device; an index acquisition unit configured to acquire from the image imaged by the imaging device an index which reflects vibration of an imaging apparatus, which is different from the imaging device and images the object; and an output unit configured to output the index to the imaging apparatus.

The present disclosure includes an imaging apparatus comprising: the object motion measurement apparatus; and at least one memory and at least one processor which function as a processing unit configured to execute processing which uses the information related to the motion of the object that is output from the object motion measurement apparatus.

The present disclosure includes an object motion measurement method comprising: imaging an object by using an imaging device; acquiring information related to a motion of the object from an image imaged by the imaging device; acquiring from the image imaged by the imaging device an index which reflects vibration of an imaging apparatus, which is different from the imaging device and images the object; and outputting the index to the imaging apparatus.

The present disclosure includes a non-transitory computer-readable medium that stores a program for causing a computer to execute an object motion measurement method comprising: imaging an object by using an imaging device; acquiring information related to a motion of the object from an image imaged by the imaging device; acquiring from the image imaged by the imaging device an index which reflects vibration of an imaging apparatus, which is different from the imaging device and images the object; and outputting the index to the imaging apparatus.

Further features of the present invention will become apparent from the following description of exemplary embodiments with reference to the attached drawings.

DESCRIPTION OF THE EMBODIMENTS

Hereinafter, embodiments of a medical image imaging apparatus which is an imaging apparatus according to the present invention will be described in detail with reference to the drawings. Note that the medical image imaging apparatus may be an arbitrary modality which can image an object. More specifically, the medical image imaging apparatus according to the present embodiment is applicable to a single modality such as a magnetic resonance imaging apparatus, an X-ray computed tomography apparatus, a PET apparatus, and a SPECT apparatus. Furthermore, the medical image imaging apparatus may be applied to a complex modality such as MR/PET apparatuses, CT/PET apparatuses, MR/SPECT apparatuses, and CT/SPECT apparatuses. In addition, the medical image imaging apparatus may be applied to a tomosynthesis apparatus.

First Embodiment

The first embodiment will be described. The first embodiment will describe an example where, when a magnetic resonance imaging apparatus images a head of a human subject, a tracking system measures a motion of the head, and corrects imaging conditions of magnetic resonance imaging according to the motion of the head. The tracking system corresponds to an object motion measurement apparatus. The tracking system acquires an index which reflects vibration of the magnetic resonance imaging apparatus, and processes a camera image of the tracking system on the basis of the index. In this example, the head of the human subject corresponds to an "object". Note that the object is not limited to the head, and may be other parts of a body or may be the entire body. Furthermore, the object is not limited to human bodies, and may be other biological bodies such as animals.

Figure 1:
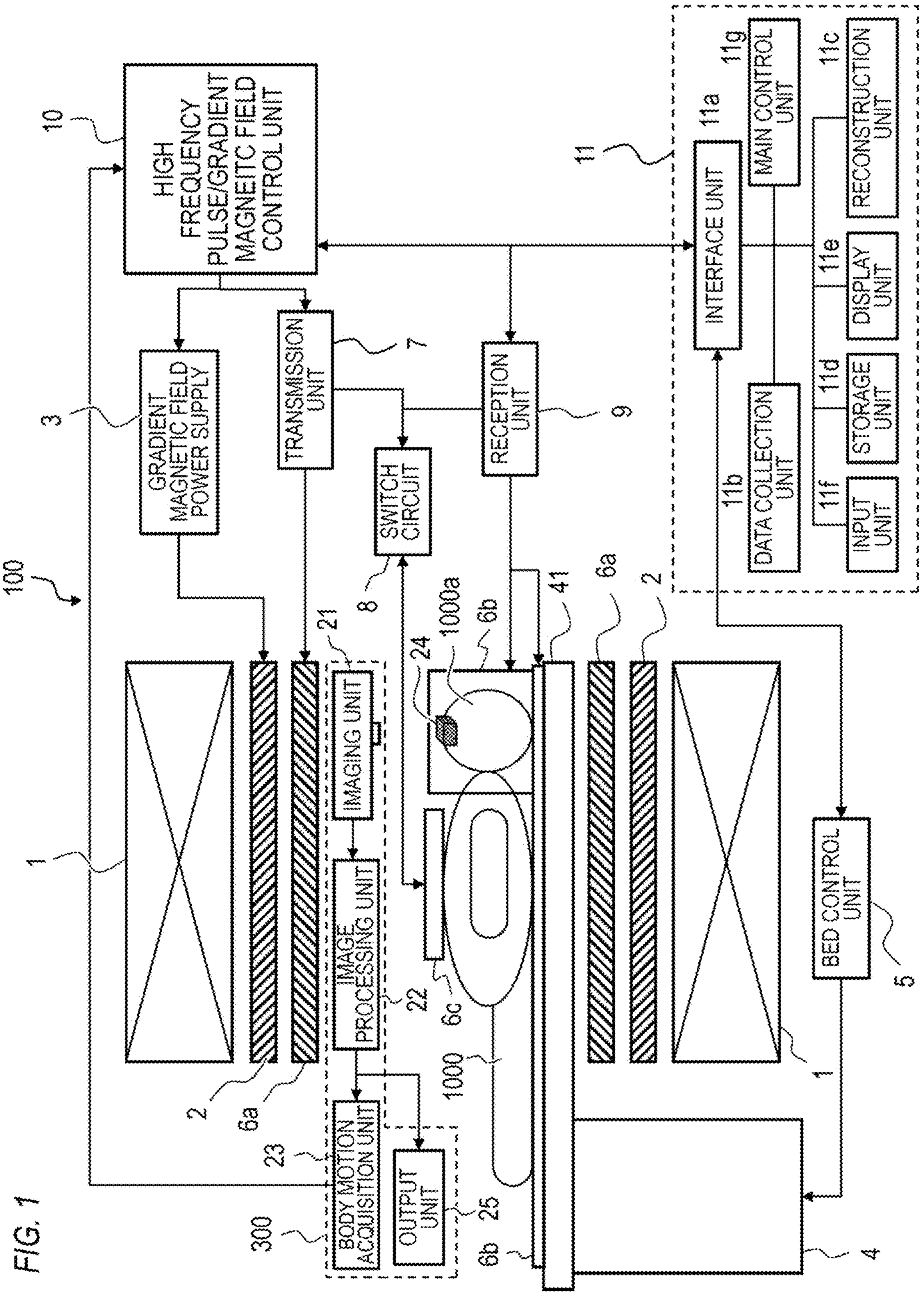
FIG. 1 is a view illustrating a configuration example of a magnetic resonance imaging apparatus according to a first embodiment.

<Entire Configuration of Medical Image Imaging Apparatus> FIG. 1 is a view illustrating a configuration example of an imaging apparatus 100 which is the medical image imaging apparatus according to the first embodiment. Description will be made below assuming that the imaging apparatus 100 is a magnetic resonance imaging apparatus. However, the imaging apparatus 100 is not limited to the magnetic resonance imaging apparatus, and may be various medical image imaging apparatuses. The imaging apparatus 100 includes a static magnetic field magnet 1, a gradient magnetic field coil 2, a gradient magnetic field power supply 3, a bed 4, a bed control unit 5, RF coil units 6*a*, 6*b*, and 6*c*, a transmission unit 7, a switch circuit 8, a reception unit 9, and a high frequency pulse/gradient magnetic field control unit 10. The imaging apparatus 100 further includes a processing unit 11 (calculator system), an imaging unit 21, an image processing unit 22, a body motion acquisition unit 23, and an output unit 25. Note that a tracking system 300 including the imaging unit 21, the image processing unit 22, the body motion acquisition unit 23, and the output unit 25 may be configured separately from the imaging apparatus 100.

The static magnetic field magnet 1 has a hollow cylindrical shape, and produces a uniform static magnetic field in an internal space. As this static magnetic field magnet 1, for example, a superconducting magnet or the like is used.

The gradient magnetic field coil 2 has a hollow cylindrical shape, and is disposed inside the static magnetic field magnet 1. The gradient magnetic field coil 2 is formed by combining three types of coils associated with respective X, Y, and Z axes orthogonal to each other. The above three types of coils of the gradient magnetic field coil 2 individually receive supply of a current from the gradient magnetic field power supply 3, and produce gradient magnetic fields whose magnetic field intensities are gradient along the respective X, Y, and Z axes. Note that a Z axis direction is, for example, a direction parallel to a static magnetic field direction. The gradient magnetic fields of the Z, Y, and X axes are associated with, for example, a slice selection gradient magnetic field Gs, a phase encode gradient magnetic field Ge, and a read-out gradient magnetic field Gr. The slice selection gradient magnetic field Gs is used to arbitrarily determine a photographing cross section. The phase encode gradient magnetic field Ge is used to change the phase of a magnetic resonance signal according to a spatial position. The read-out gradient magnetic field Gr is used to change the frequency of the magnetic resonance signal according to the spatial position.

A human subject 1000 is inserted into a space (imaging space) inside the gradient magnetic field coil 2 in a state where the human subject 1000 lies facing a top panel 41 of the bed 4. Note that this imaging space is referred to as an interior of a bore. The bed 4 moves the top panel 41 in a longitudinal direction (a left/right direction in FIG. 1) and an upper/lower direction of the top panel 41 under control of the bed control unit 5. Generally, the bed 4 is installed such that this longitudinal direction is parallel to the center axis of the static magnetic field magnet 1.

The RF coil unit 6*a* is a coil unit for transmission. The RF coil unit 6*a* is formed by housing one or a plurality of coils in a cylindrical case. The RF coil unit 6*a* is disposed inside the gradient magnetic field coil 2. The RF coil unit 6*a* receives supply of a high frequency signal (RF signal) from the transmission unit 7, and produces a high frequency magnetic field (RF magnetic field). The RF coil unit 6*a* can produce the RF magnetic field in a wider area which includes most of the human subject 1000. That is, the RF coil unit 6*a* includes a so-called Whole Body (WB) coil.

The RF coil unit 6b is a coil unit for reception. The RF coil unit 6b is placed on the top panel 41, is built in the top panel 41, or is attached to an object 1000a of the human subject 1000. Furthermore, at a time of photographing, the RF coil unit 6b is inserted into the imaging space together with the object 1000a. As the RF coil unit 6b, various types are arbitrarily attachable. The RF coil unit 6b detects a magnetic resonance signal produced in the object 1000a. A coil for a head in particular is referred to as a head RF coil.

The RF coil unit 6c is a coil unit for transmission and reception. The RF coil unit 6c is placed on the top panel 41, is built in the top panel 41, or is attached to the human subject 1000. The RF coil unit 6c is inserted into the imaging space together with the human subject 1000 at the time of photographing. As the RF coil unit 6c, various types are arbitrarily attachable. The RF coil unit 6c receives supply of the RF signal from the transmission unit 7, and produces an RF magnetic field. Furthermore, the RF coil unit 6c detects the magnetic resonance signal produced in the human subject 1000. As the RF coil unit 6c, an array coil formed by aligning a plurality of coil elements can be used. The RF coil unit 6c is smaller than the RF coil unit 6a, and produces an RF magnetic field which includes only a local portion of the human subject 1000. That is, the RF coil unit 6c includes a local coil. As the head coil, a local transmission/reception coil may be used.

The transmission unit 7 selectively supplies an RF pulse associated with a Lamor frequency to the RF coil unit 6a or the RF coil unit 6c. Note that the transmission unit 7 varies the amplitude and the phase between the RF pulse to be supplied to the RF coil unit 6a and the RF pulse to be supplied to the RF coil unit 6c adaptively according to a difference in the magnitude of the RF magnetic field to be formed.

The switch circuit 8 connects the RF coil unit 6c to the transmission unit 7 during a transmission period in which the RF magnetic field needs to be produced, and to the reception unit 9 during a reception period in which the magnetic resonance signal needs to be detected. Note that the transmission period and the reception period are instructed by the processing unit 11. The reception unit 9 performs processing such as amplification, phase detection, and, moreover, analog-digital conversion on the magnetic resonance signals detected by the RF coil units 6b and 6c, and obtains magnetic resonance data.

The processing unit 11 includes an interface unit 11a, a data collection unit 11b, a reconstruction unit 11c, a storage unit 11d, a display unit 11e, an input unit 11f, and a main control unit 11g. The interface unit 11a is connected with the high frequency pulse/gradient magnetic field control unit 10, the bed control unit 5, the transmission unit 7, the switch circuit 8, the reception unit 9, and the like. The interface unit 11a inputs and outputs a signal sent and received between each of these connected units and the processing unit 11. The data collection unit 11b collects magnetic resonance data output from the reception unit 9. The data collection unit 11b stores the collected magnetic resonance data in the storage unit 11d. The reconstruction unit 11c executes post-processing, that is, reconstruction such as Fourier transform with respect to the magnetic resonance data stored in the storage unit 11d, and obtains spectrum data or MR image data of a desired nuclear spin in the human subject 1000. The storage unit 11d stores the magnetic resonance data, and the spectrum data or the image data per human subject. The display unit 11e displays various pieces of information such as the spectrum data or the image data under control of the main control unit 11g. As the display unit 11e, a display device such as a liquid crystal display can be used. The input unit 11f accepts various instructions and information inputs from an operator. As the input unit 11f, a pointing device such as a mouse or a track ball, a selection device such as a mode switch, or an input device such as a keyboard can be used as appropriate. The main control unit 11g includes an unillustrated CPU (processor), memory, and the like, and generally controls the imaging apparatus 100.

The high frequency pulse/gradient magnetic field control unit 10 controls the gradient magnetic field power supply 3 and the transmission unit 7 to change each gradient magnetic field and transmit the RF pulse according to a desired pulse sequence under control of the main control unit 11g. Furthermore, the high frequency pulse/gradient magnetic field control unit 10 can also change each gradient magnetic field on the basis of information (hereinafter, also described as motion information) related to the motion of the object 1000a sent from the body motion acquisition unit 23. Note that the function of the high frequency pulse/gradient magnetic field control unit 10 may be integrated with the main control unit 11g.

The imaging unit 21, the image processing unit 22, the body motion acquisition unit 23, and a marker 24 detect the motion of the object 1000a, and transmit this motion to the high frequency pulse/gradient magnetic field control unit 10. The high frequency pulse/gradient magnetic field control unit 10 also can control the gradient magnetic fields and substantially fix an imaging plane on the basis of the transmitted motion. Consequently, the high frequency pulse/gradient magnetic field control unit 10 can obtain image data which does not produce a motion artifact even when an object moves, and obtain an image of a corrected motion. Generally, a motion correction method for changing the gradient magnetic fields in real time according to a measured motion of an object, and keeping an imaging plane at all times will be generally referred to as Prospective Motion Correction. On the other hand, there is also a method for measuring and recording a motion of an object during MR photographing, and correcting a motion of an MR image using motion measurement data after MR photographing, and this method is referred to as Retrospective Motion Correction. Any one of the motion correction methods may be used as long as the method can reduce a motion artifact compared to a conventional MR image.

Note that the "motion" generally indicates a motion of the six degrees of freedom in a case of a rigid body in the three-dimensional space, and is expressed as the three degrees of freedom of rotation and the three degrees of freedom of translation. This description will describe an example where the motion of the six degrees of freedom is obtained. However, the degrees of freedom may be any degrees of freedom as long as a motion of an object can be expressed.

The imaging unit 21 is an optical imaging unit, is generally an imaging device such as a camera, yet may be any sensing device as long as the sensing device can optically image or capture the object. In the present embodiment, to assist accurate capturing of the motion and the position of the object, a marker to which a predetermined pattern has been printed is attached to an object, and the imaging unit 21 images the marker attached to the object. In this regard, the imaging unit 21 may capture the motion of the object by tracking feature points of the object itself such as a wrinkle or eyebrow pattern as a skin texture, a nose which is a characteristic face organ, surroundings of eyes, the shape of the forehead, and the like without using a marker.

In a case where of a configuration where the camera is used as the imaging unit 21, the number of cameras may be one or may be two or more. In a case where, for example, a marker is used, and a positional relationship between a plurality of feature points on a pattern in the marker is known, a motion of the marker can be calculated from an image obtained by one camera. In a case where the marker is not used or in a case where the marker is used, yet a positional relationship between feature points is not known, three-dimensional information of an object may be measured by so-called stereoscopic photography. A stereoscopic photography method includes various methods such as a passive stereo method which uses two or more cameras and an active stereo method which uses a projector and a camera in combination, and any method may be used. By increasing the number of cameras, it is possible to enhance measurement accuracy of motions of various axes. Furthermore, a three-dimensional information acquisition apparatus such as a LiDAR may acquire three-dimensional information.

Furthermore, the imaging unit 21 desirably supports MR. That the imaging unit 21 supports MR means that the imaging unit 21 normally operates even in a strong magnetic field environment according to a configuration which reduces noise which influences image data at a time of MR photographing as much as possible. For example, a camera for which a magnetic body material is not used and which is provided with a magnetic shield is an example of a camera which supports MR. Furthermore, the imaging unit 21 can be also disposed in a bore which is a space surrounded by the static magnetic field magnet 1 and the gradient magnetic field coil 2 as in FIG. 1, and can be disposed outside a bore in a case where there is no space in the bore. As long as a marker or an object can be imaged within a predetermined imaging range (Field of View: FOV), the imaging unit 21 may be disposed in any way.

In a case where the camera is used as the imaging unit 21, a light (not illustrated) may be used. By using the light, the imaging unit 21 can image the marker or the object with a high contrast. Note that the light desirably supports MR, and a LED light which supports MR or the like can be used. The light may be a light of any wavelength and wavelength range such as white light, monochromatic light, near infrared light, infrared light, or the like as long as the marker or the object can be imaged with a high contrast. In this regard, taking a burden on a human subject into account, near infrared light and infrared light having wavelengths which are invisible to eyes are preferable.

The image processing unit 22 acquires pixel positions of feature points from the image imaged by the imaging unit 21. The image processing unit 22 may use any method such as image binarization, intersection calculation, contour extraction, center-of-gravity calculation, and pattern matching as long as the method can acquire the pixel positions of the feature points.

The body motion acquisition unit 23 calculates positions, orientations, and motions of the feature points in a real space on the basis of the pixel positions of the feature points acquired by the image processing unit 22. The body motion acquisition unit 23 acquires the positions and the motions of the feature points as a motion (body motion) of the object in chronological order.

The output unit 25 outputs to the imaging apparatus 100, for example, information such as an index acquired by the image processing unit 22 from the image imaged by the imaging unit 21.

The image processing unit 22, the body motion acquisition unit 23, and the output unit 25 may be configured by a computer which includes processors such as a CPU, a GPU, and an MPU, and memories such as a ROM and a RAM as hardware resources, and programs which are executed by these processors. Alternatively, the image processing unit 22, the body motion acquisition unit 23, and the output unit 25 may be implemented by an Application Specific Integrated Circuit (ASIC), a Field Programmable Gate Array (FPGA), other Complex Programmable Logic Devices (CPLDs), or a Simple Programmable Logic Device (SPLD). Furthermore, the image processing unit 22, the body motion acquisition unit 23, and the output unit 25 may be implemented as one of functions of the processing unit 11 of the imaging apparatus 100. Furthermore, part of the functions of the image processing unit 22 and the body motion acquisition unit 23 may be implemented on a cloud via a network.

The imaging unit 21, the image processing unit 22, the body motion acquisition unit 23, and the output unit 25 will be collectively referred to as a tracking system 300. The tracking system 300 is an example of an object motion measurement apparatus which measures a motion of an object, and outputs motion information of the object. The output unit 25 can output information acquired or generated by the tracking system 300 to an external apparatus.

Figure 2:
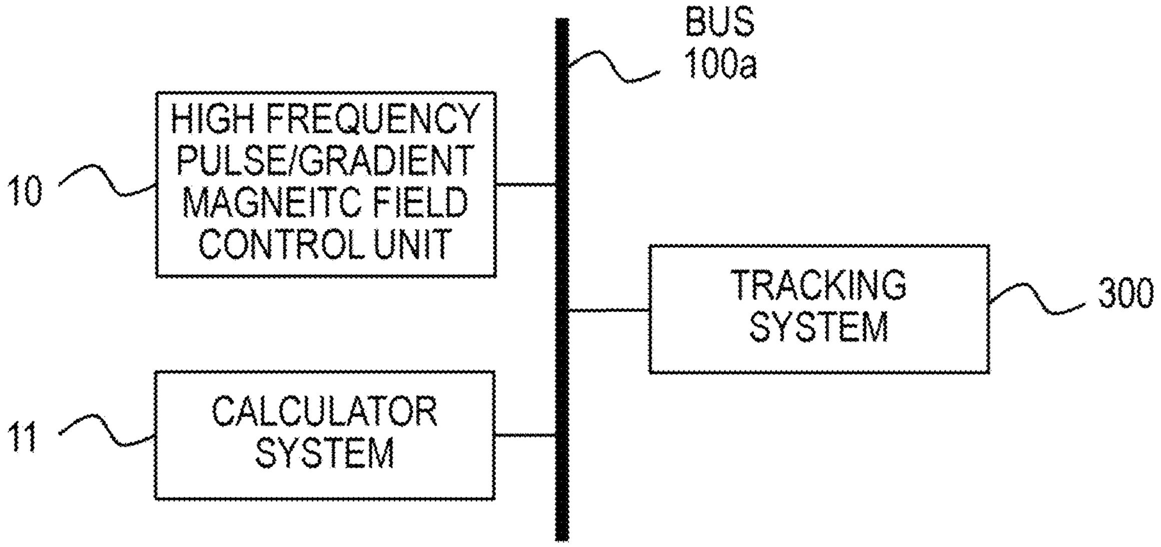
FIG. 2 is a view illustrating an example of connection between components of the magnetic resonance imaging apparatus.

FIG. 2 is a view illustrating an example of connection between components of the imaging apparatus 100. The high frequency pulse/gradient magnetic field control unit 10, the processing unit 11, and the tracking system 300 are connected via a bus 100*a*, and can mutually exchange information with each other. Similarly, the other components illustrated in FIG. 1 are connected to the bus 100*a*, and the components of the imaging apparatus 100 can exchange information with each other.

Figure 3A:
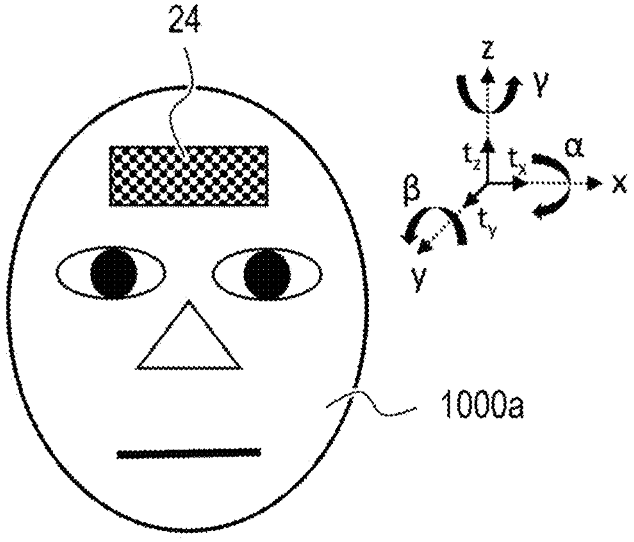
FIGS. 3A and 3B are views for describing an example of processing of an image acquisition unit and a body motion acquisition unit.
Figure 3B:
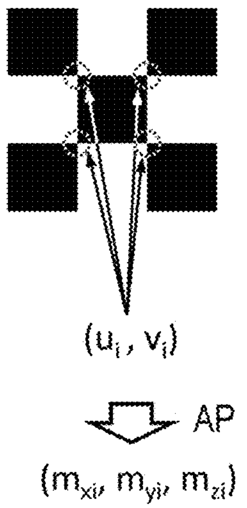

An example of processing of the image processing unit 22 and the body motion acquisition unit 23 will be described with reference to FIGS. 3A and 3B. FIG. 3A illustrates an example where a motion measurement marker 24 is fixed to the head which is the object 1000*a*. The image processing unit 22 and the body motion acquisition unit 23 acquire a moving image obtained by imaging the marker 24 from the imaging unit 21, and acquire motion information of the marker 24 from each frame image of this moving image. It is assumed that an internal parameter matrix A (3×3 matrix) of the camera has already been acquired in advance by calibration.

A specific example of a method for acquiring the motion information of the head will be described. FIGS. 3A and 3B illustrate the example where one camera and the marker 24 of a checkerboard pattern are used. As illustrated in FIG. 3B, the image processing unit 22 acquires pixel positions $(u_i, v_i)$ of feature points from the pattern on the marker 24 in a camera image at each time. Note that i represents a subscript indicating that there are a plurality of feature points. The subscript i will be omitted in the following description depending on cases.

According to the checkerboard pattern, the feature point can be, for example, each corner. Furthermore, a relative positional relationship between the respective feature points of the pattern on the marker 24 is known, and, when a coordinate system in this case is a marker coordinate system, three-dimensional coordinates of each feature point are $(m_{xi}, m_{yi}, m_{zi})$.

The pixel positions $(u_i, v_i)$ in the camera coordinate system and coordinates $(m_{xi}, m_{yi}, m_{zi})$ of the corresponding feature points in the marker coordinate system can be expressed according to a following relational expression.

$$\begin{bmatrix} u \\ v \\ 1 \end{bmatrix} = AP \begin{bmatrix} m_x \\ m_y \\ m_z \\ 1 \end{bmatrix} \quad \text{[Math. 1]}$$

A represents the internal matrix (3×3 matrix) of the camera, and P represents a projection matrix (3×4 matrix) and includes a rotation matrix and a translational matrix. P is expressed as follows.

$$P = \begin{bmatrix} R_{11} & R_{12} & R_{13} & t_x \\ R_{21} & R_{22} & R_{23} & t_y \\ R_{31} & R_{32} & R_{33} & t_z \end{bmatrix} = \begin{bmatrix} R_{11} & R_{12} & R_{13} \\ R_{21} & R_{22} & R_{23} \\ R_{31} & R_{32} & R_{33} \end{bmatrix} + \begin{bmatrix} t_x \\ t_y \\ t_z \end{bmatrix} = R + t \quad \text{[Math. 2]}$$

$$R = \begin{bmatrix} R_{11} & R_{12} & R_{13} \\ R_{21} & R_{22} & R_{23} \\ R_{31} & R_{32} & R_{33} \end{bmatrix} =$$

$$\begin{bmatrix} \cos\beta\cos\gamma & -\cos\beta\cos\gamma & \sin\beta \\ \sin a\sin\beta\cos\gamma + \cos\alpha\sin\gamma & -\sin a\sin\beta\sin\gamma + \cos\alpha\sin\gamma & -\sin\alpha\cos\beta \\ -\cos a\sin\beta\cos\gamma + \sin\alpha\sin\gamma & \cos a\sin\beta\sin\gamma + \sin\alpha\cos\gamma & \cos\alpha\cos\gamma \end{bmatrix}$$

$$t = \begin{bmatrix} t_x \\ t_y \\ t_z \end{bmatrix}$$

As illustrated in FIG. 3A, α, β, and γ represent rotation angles about x, y, and z axes which express three degrees of freedom of rotation, and $t_x$, $t_y$, and $t_z$ represent movement amounts in x, y, and z axis directions which express three degrees of freedom of translation. In a case of a rigid body, these six degrees of freedom can express a motion.

The projection matrix P indicates a transformational matrix of corresponding feature points from the marker coordinate (or world coordinate) system into the camera coordinate system. The number of variables of the projection matrix P is 12 (the number of the degrees of freedom is six). The projection matrix P can be obtained by using, for example, six-point algorithm which uses a relationship between the pixel positions ($u_i$, $v_i$) of the six points or more in the camera coordinate system, and coordinates ($m_{xi}$, $m_{yi}$, $m_{zi}$) of the corresponding feature points in the marker coordinate system. Note that the projection matrix P may be obtained not only by the six-point algorithm, but also by any method such as non-linear analysis.

It is temporarily assumed that a projection matrix obtained from a camera image acquired at a certain time $t_0$ is $P_{t0}$, and a projection matrix obtained from a camera image acquired at a time $t_1$ of a next frame is $P_{t1}$. A motion of a marker ($P_{camera,\, t0 \to t1}$) from the times $t_0$ to $t_1$ can be obtained as follows.

$$P_{camera,t0 \to t1} = P_{t1} P_{t0}^{-1}$$

Consequently, it is possible to acquire the motion of the six degrees of freedom (α, β, γ, $t_x$, $t_y$, $t_z$) illustrated in FIG. 3A.

Note that, although an example of a body motion acquisition method for acquiring the motion information of the object 1000*a* will be described hereinafter, the image processing unit 22 and the body motion acquisition unit 23 may use any method as long as the method can acquire the motion at each time. For example, although an example will be described where the motion of the object 1000*a* is obtained from a camera image of one camera, the image processing unit 22 and the body motion acquisition unit 23 may obtain a motion using images of two or more cameras. The image processing unit 22 and the body motion acquisition unit 23 can accurately capture the motion of the six degrees of freedom by using images of a plurality of cameras in a complementary manner.

Furthermore, in a case where relative positions between feature points on the marker 24 are unknown, the image processing unit 22 may obtain the three-dimensional coordinate of each feature point using three-dimensional measurement means such as stereoscopic photographing. In such a case, the three-dimensional coordinates ($m_{xi}$, $m_{yi}$, $m_{zi}$) of each feature point correspond to the three-dimensional coordinates obtained by the three-dimensional measurement means such as stereoscopic photographing. In a case where the three-dimensional measurement means such as stereoscopic photographing is used, relative position information between feature points may be unknown. Consequently, the image processing unit 22 and the body motion acquisition unit 23 can capture the motion of the six degrees of freedom of the object 1000*a* using, for example, a skin texture such as a wrinkle as feature points. In this case, the marker 24 may not be attached to the object 1000*a*, so that it is possible to reduce a burden on the human subject.

Generally, the motion of the object 1000*a* can be obtained by the above method. However, vibration accompanying application of gradient magnetic fields of magnetic resonance imaging or the like produces a motion blur in a camera image in some cases. When the motion blur is produced in the camera image, detection of feature points and acquisition of a motion of an object fail, and detection accuracy of the feature points and accuracy of the motion of the object to be acquired lower in some cases.

Figure 4A:
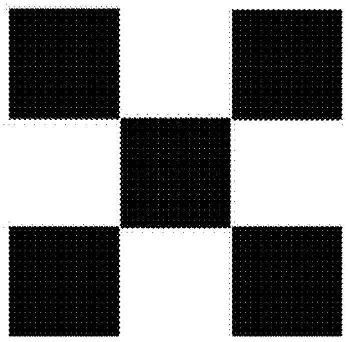
FIGS. 4A and 4B are views for describing a motion blur produced by vibration.
Figure 4B:
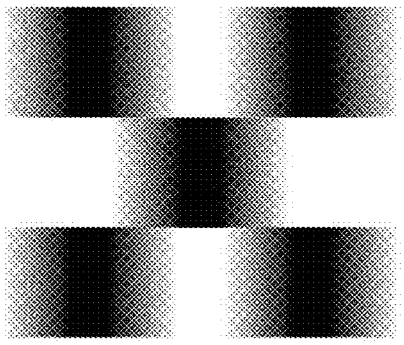

FIGS. 4A and 4B are views for describing a motion blur produced by vibration. FIG. 4A illustrates the marker 24 of the checkerboard pattern. FIG. 4B illustrates a state where the checkerboard pattern of the marker 24 in FIG. 4A receives a motion blur due to vibration in a lateral direction. A contrast of white and black around an intersection lowers, and therefore an algorithm of detecting the intersection on the basis of a difference in the contrast fails or accuracy of a pixel position of the detected intersection lowers.

Hence, in the first embodiment, the tracking system 300 corrects the camera image using a Point Spread Function (PSF) of the motion blur which is an index which reflects the vibration when detecting the vibration. The image processing unit 22 and the body motion acquisition unit 23 detect the feature points from the corrected camera image, and acquire the motion of the object.

Figure 5:
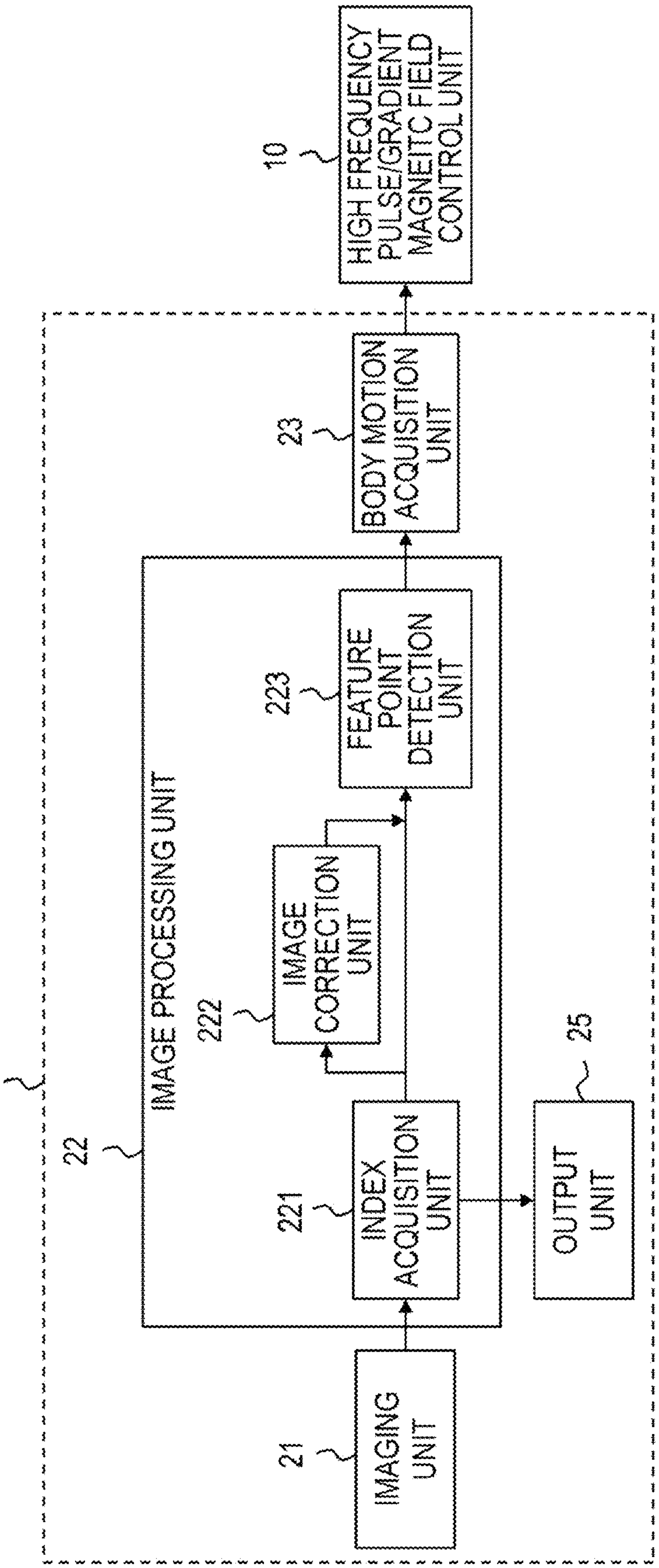
FIG. 5 is a view illustrating a configuration example of a tracking system according to the first embodiment.
Figure 6:
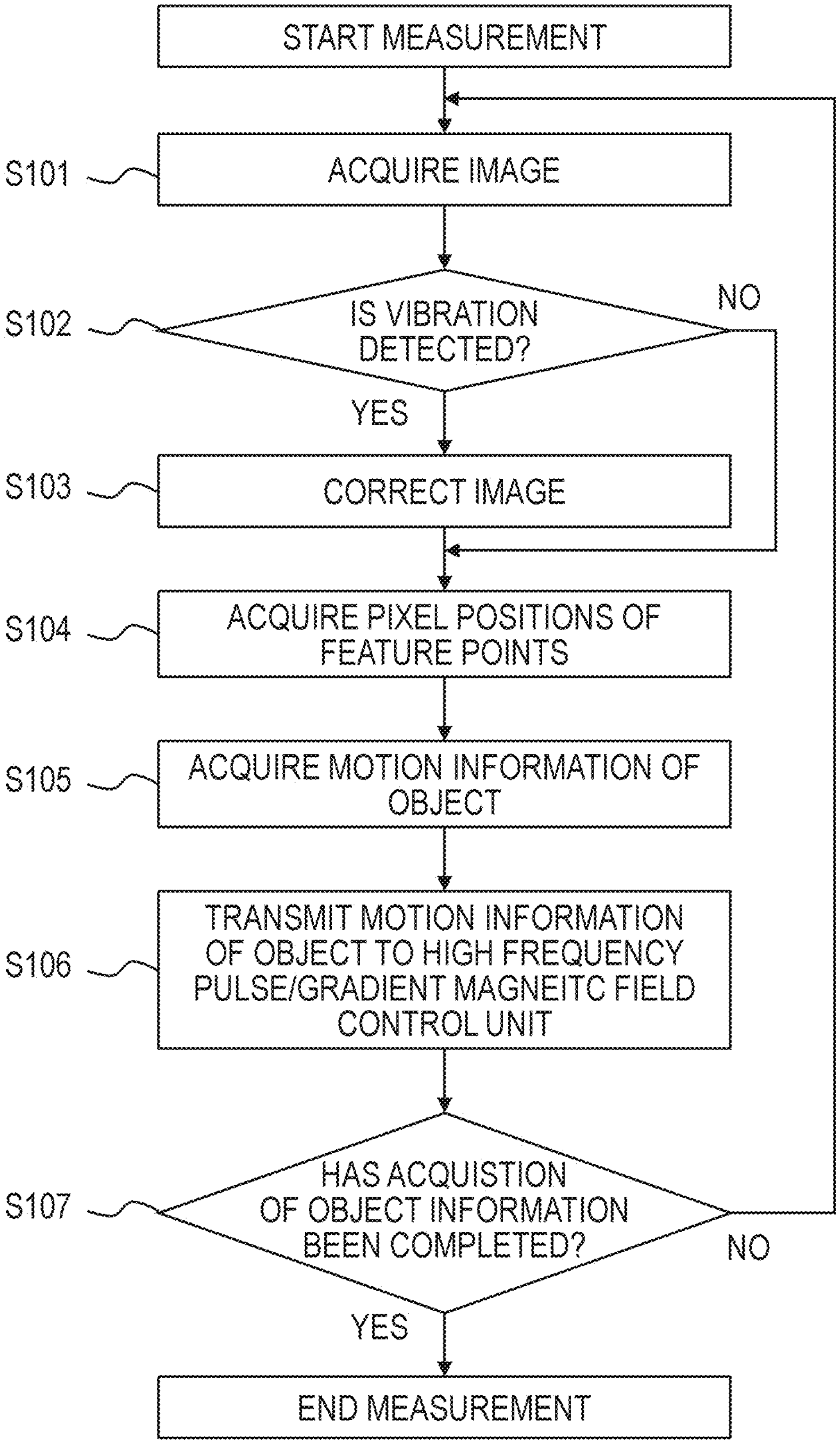
FIG. 6 is a flowchart illustrating an example of measurement processing according to the first embodiment.

Processing of the tracking system 300 will be described with reference to FIGS. 5 and 6. FIG. 5 is a view illustrating a configuration example of the tracking system 300 according to the first embodiment. The tracking system 300 includes the imaging unit 21, the image processing unit 22, the body motion acquisition unit 23, and the output unit 25. The tracking system 300 measures the motion of the object, and outputs the motion information of the object to the high frequency pulse/gradient magnetic field control unit 10.

In the first embodiment, the image processing unit 22 includes an index acquisition unit 221, an image correction unit 222, and a feature point detection unit 223. Details of processing of the index acquisition unit 221, the image correction unit 222, and the feature point detection unit 223 will be described together with processing in a flowchart illustrated in FIG. 6. FIG. 6 is the flowchart illustrating an example of measurement processing according to the first embodiment.

In step S101, the imaging unit 21 acquires the image of the object, and transmits the image to the image processing unit 22. Furthermore, the imaging apparatus 100 starts acquiring object information (image processing of the object).

In step S102, the index acquisition unit 221 detects vibration from the image acquired in step S101, and acquires the index which reflects the vibration. The index acquisition unit 221 can detect the vibration using, for example, a total sum of squares of absolute values of pixel values. The index acquisition unit 221 can acquire the vibration of the object detected from the image of the object as vibration of the imaging apparatus 100. The motion blur of the image produced by the vibration has lowpass filter characteristics, and therefore the total sum of the squares of the absolute values of frequency components of the image in a case where there is vibration is smaller than that of an image in a case where there is no vibration.

According to an equation of Parseval, the total sum of the squares of the absolute values of the frequency components is equal to the total sum of the squares of the absolute values of the pixel values, so that the index acquisition unit 221 can determine that the vibration has occurred when the total sum of the squares of the absolute values of the pixel values becomes smaller than a set threshold. The index acquisition unit 221 may determine that the vibration has occurred using any information as long as the total sum is, for example, a total sum of numbers to the power of one instead of the total sum of the squares, and is based on the pixel values which make it possible to detect vibration. For example, the index acquisition unit 221 may use a total sum which is based on frequency components as described above. The index acquisition unit 221 may use an information amount such as an entropy of an image to determine that vibration has occurred taking advantage of that the information amount of the image lowers due to the motion blur.

Furthermore, the index acquisition unit 221 may determine whether or not vibration has occurred (hereinafter, also described as whether or not there is vibration) according to whether or not feature points are successfully detected taking advantage of that detection of the feature points fails due to the motion blur. Furthermore, the index acquisition unit 221 may determine whether or not there is vibration using a machine learning circuit which has learned to output a vibration amount or whether or not there is the vibration.

As described above, the index acquisition unit 221 may use any method as long as the method can determine whether or not there is vibration. Note that the above-described total sum based on the pixel values, total sum based on the frequency components, entropy of an image, whether or not feature points are successfully detected, and output of the machine learning circuit are examples of the index which reflects vibration. The output unit 25 outputs the index acquired by the index acquisition unit 221 to the imaging apparatus 100. The imaging apparatus 100 may execute imaging processing on the basis of the index from the output unit 25.

Figure 7:
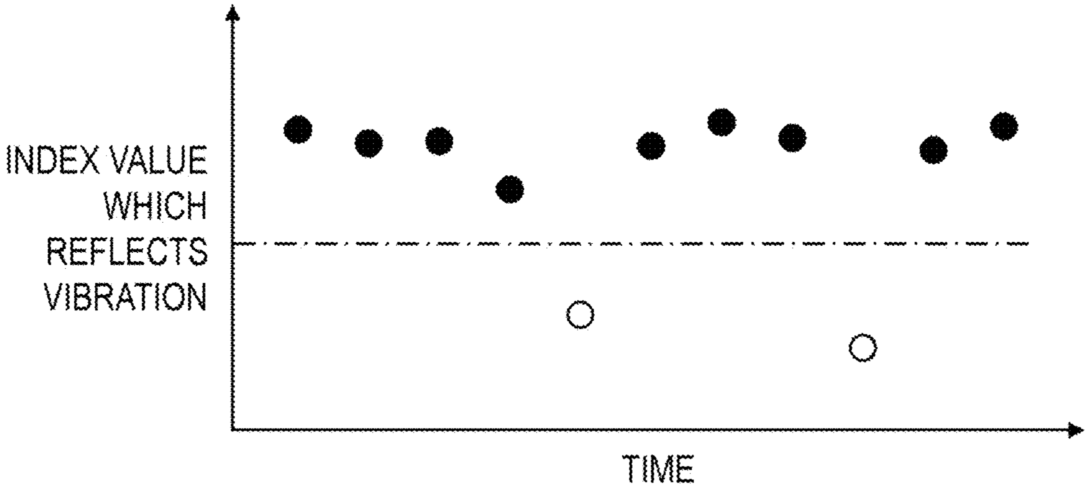
FIG. 7 is a view illustrating a graph showing a temporal change in an index value which reflects the vibration.

Determination on whether or not there is vibration based on an index value which reflects vibration will be described with reference to FIG. 7. FIG. 7 is a view illustrating a graph showing a temporal change of the index value which reflects the vibration. In the graph in FIG. 7, as the index value is smaller, the vibration is greater. For example, the index acquisition unit 221 can determine that there is vibration in a case where the index value is equal to or less than a threshold indicated by a dashed line (white circles), and determine that there is no vibration in a case where the index value exceeds the threshold (black circles). In the case where there is the vibration, the processing proceeds to step S103, and, in a case where there is no vibration, the processing proceeds to step S104.

In step S103, the image correction unit 222 corrects the image which has received the motion blur due to the vibration. More specifically, the image correction unit 222 acquires, for example, the PSF as the index, executes image processing with respect to the image which has received the motion blur, on the basis of the acquired PSF, and thereby reduces the motion blur.

The index acquisition unit 221 of the image correction unit 222 first acquires the PSF of the vibration using an image (second image) without a motion blur, and an image (first image) with the motion blur. In a case where, for example, a latest image without a motion blur and a current image with a motion blur converted in a frequency domain are X and Y, and inverse Fourier transform is IFT (•), the image correction unit 222 can acquire PSF=IFT (Y/X). The Wiener filter or the like may be used for Y/X.

As the image without the motion blur, it is desirable to use an image which is the temporally nearest the image with the motion blur and from which vibration is not detected. This is because, by using the latest image, the image correction unit 222 can reduce a change in the image due to a motion of an object (e.g., a change in a perspective due to rotation), reduce a component resulting from the motion of the object included in the acquired PSF, and enhance accuracy of the PSF of the vibration. Furthermore, the image correction unit 222 may obtain the PSF after processing of reducing a difference between both of the images due to other than the vibration.

Next, the image correction unit 222 reduces an influence of the motion blur by deconvoluting the image with the motion blur using the PSF of the vibration. The image correction unit 222 can use the Wiener filter or the like for deconvolution. A frequency component X' of the image of the reduced motion blur can be expressed as follows, for example, in a case where Fourier transform is FFT(•) and an overline is a complex conjugate.

$$X' = \frac{\overline{FFT(PSF)}}{\left(|FFT(PSF)|^2 + \sigma^2\right)} Y \quad \text{[Math. 3]}$$

σ represents a noise-signal ratio of a frequency component, yet may be a hyper parameter.

Furthermore, it is desirable to store the motion of the object included in the phase of the PSF by performing deconvolution using only the amplitude. The PSF of the motion blur due to vibration has high symmetry, so that it is possible to obtain an effect of reduction of the motion blur by performing deconvolution using only the amplitude.

In this regard, in a case where the PSF which does not include the phase of the motion of the object and reflects the phase of only the vibration, the image correction unit 222 may perform deconvolution including the phase. The image correction unit 222 can acquire the PSF of the only vibration by, for example, the machine learning circuit or blind deconvolution. In a case where, for example, vibration has reproducibility, the image correction unit 222 may use the PSF acquired in advance. The image correction unit 222 may perform blind deconvolution without using the image without the motion blur. In this regard, a PSF obtained by using the image without the motion blur may be used as an initial value of blind deconvolution.

In step S102, the image correction unit 222 may perform a PSF acquisition method in step S103, and use a vibration amount obtained from the PSF for determination on whether or not there is vibration. Furthermore, the image correction unit 222 may perform processing of acquiring the PSF and reducing the motion blur irrespectively of whether or not there is vibration without making binary determination on whether or not there is the vibration. In this case, the image correction unit 222 can appropriately correct the image using the PSF which reflects the vibration amount according to whether the vibration is great or little. The PSF which reflects the vibration amount is an example of the index which reflects the vibration. By performing the above processing, the image correction unit 222 can detect feature points, and improve detection accuracy by making the image in which the motion blur in FIG. 4B has been produced close to the image without the motion blur in FIG. 4A.

Figure 8A:
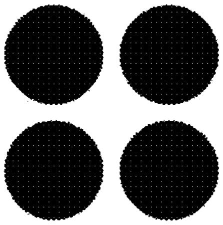
FIGS. 8A to 8D are views for describing detection of feature points based on an index which reflects the vibration.
Figure 8B:
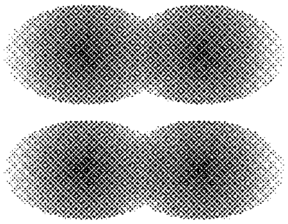
Figure 8C:
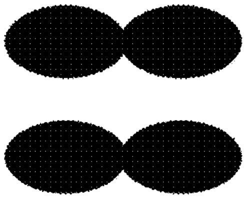
Figure 8D:
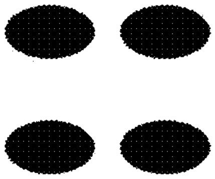

In a case where the index acquisition unit 221 detects vibration, the processing of the feature point detection unit 223 may be changed. The feature point detection unit 223 changes a binarization threshold when, for example, binarizing an image, and detecting the feature points. The marker 24 which include the centers of the four circles illustrated in FIG. 8A as the feature points is in a state where, for example, a blur as illustrated in FIG. 8B is produced due to the motion blur. When binarization is performed in the state where the blur is produced, part of the circles are connected to each other as illustrated in FIG. 8C, and it becomes difficult to detect the individual circles in some cases. In the case where it is determined in step S102 that there is the vibration, the feature point detection unit 223 can acquire a binarization image in which the individual circles are separated as illustrated in FIG. 8D, and easily detect the feature points by changing the binarization threshold such that the contours of the circles become small.

In step S104, the feature point detection unit 223 acquires pixel positions of the feature points from the image acquired by the imaging unit 21. The feature point detection unit 223 may use any method such as image binarization, intersection calculation, contour extraction, center-of-gravity calculation, and pattern matching as long as the method can acquire the pixel positions of the feature points. Even when the image receives a motion blur due to vibration, the influence of the motion blur is reduced in step S103, so that the feature point detection unit 223 can accurately acquire the pixel positions of the feature points.

In step S105, the body motion acquisition unit 23 acquires motion information of the object on the basis of the pixel positions of the feature points acquired in step S104.

In step S106, the body motion acquisition unit 23 transmits the motion information of the object acquired in step S105 to the high frequency pulse/gradient magnetic field control unit 10. The high frequency pulse/gradient magnetic field control unit 10 controls gradient magnetic fields on the basis of the motion information of the object, and performs measurement for acquiring object information while correcting the motion of the object. Furthermore, the body motion acquisition unit 23 may acquire the motion information of the object, and then correct the object information by Retrospective Motion Correction.

In step S107, the tracking system 300 determines whether or not the imaging apparatus 100 has completed acquiring the object information. When, for example, the imaging unit 21 stops acquiring an image according to an instruction of a user, the tracking system 300 can determine that acquisition of the object information has been completed. In a case where acquisition of the object information is not completed, the tracking system 300 repeatedly executes the processing in step S101 to step S107. In a case where acquisition of the object information has been completed, the tracking system 300 finishes the measurement processing illustrated in FIG. 6.

According to the above first embodiment, the imaging apparatus 100 can accurately measure the motion of the object even when the imaging apparatus 100 vibrates. By, for example, performing control such as correction of the gradient magnetic fields or performing image reconstruction on the basis of the accurate motion information of the object, the imaging apparatus 100 can obtain a quality image with a less artifact. The first embodiment is not limited to the above example, and processing with respect to an image used to acquire the motion information of the object is also applicable to any aspect executed on the basis of the index which reflects vibration.

Second Embodiment

The second embodiment will be described. The second embodiment is an embodiment where part of motion information of an object is estimated. The tracking system 300 uses past or future motion information of an object to estimate the motion information of the object at a time when vibration of the imaging apparatus 100 is detected.

In the second embodiment, when the imaging apparatus 100 images the head of the human subject, the tracking system 300 measures the motion of the head, and corrects imaging conditions of magnetic resonance imaging according to the motion of the head. The imaging apparatus 100 acquires the index which reflects vibration of the imaging apparatus 100, and the tracking system 300 acquires motion information of the head on the basis of the acquired index. The head of the human subject corresponds to an "object". Note that the object is not limited to the head, and may be other parts of the body of the human subject or may be the entire body of the human subject. Furthermore, the object is not limited to a human body, and may be other biological bodies such as animals.

The components of the imaging apparatus 100 according to the second embodiment other than the image processing unit 22 and the body motion acquisition unit 23 are the same as those of the imaging apparatus 100 according to the first embodiment. Description of the same components as those of the imaging apparatus 100 according to the first embodiment will be omitted.

Figure 9:
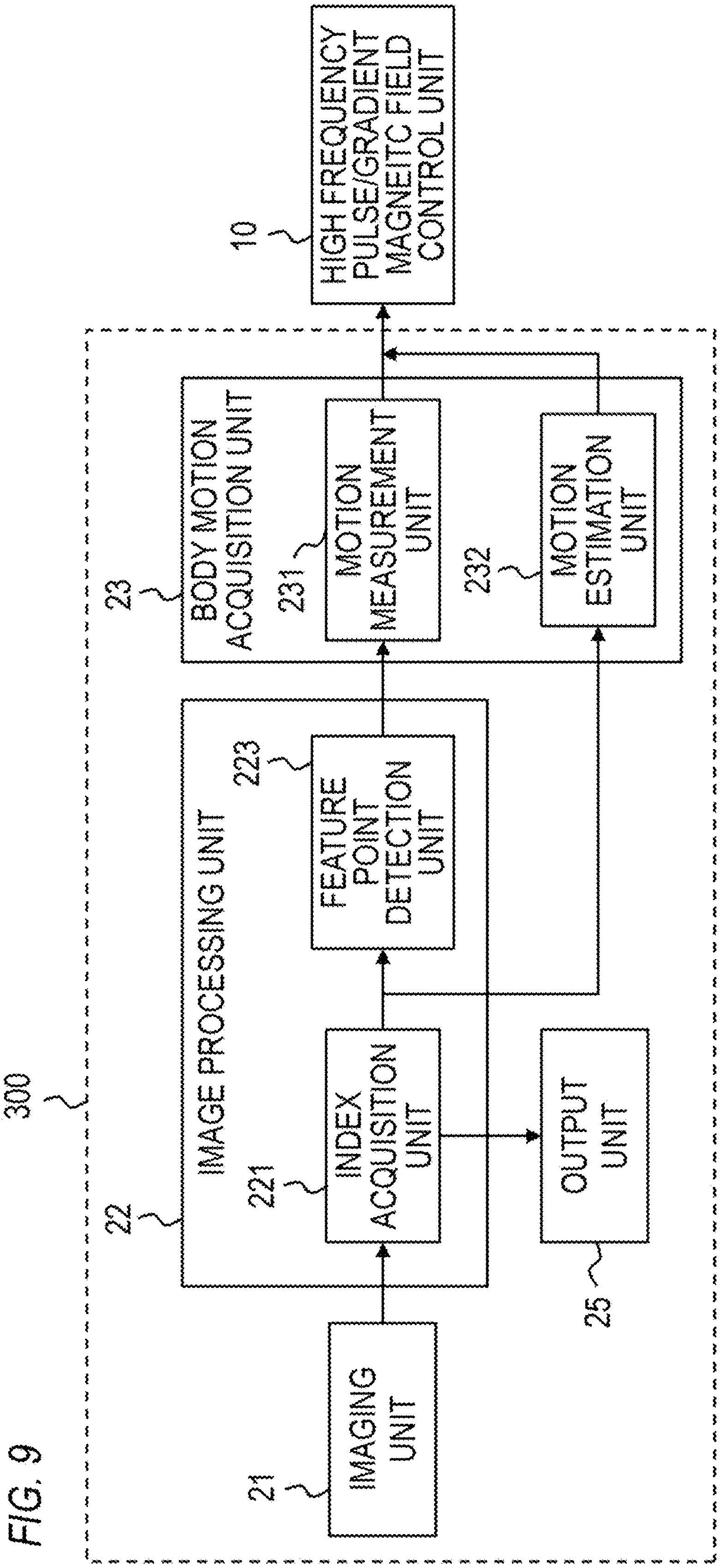
FIG. 9 is a view illustrating a configuration example of the tracking system according to a second embodiment.
Figure 10:
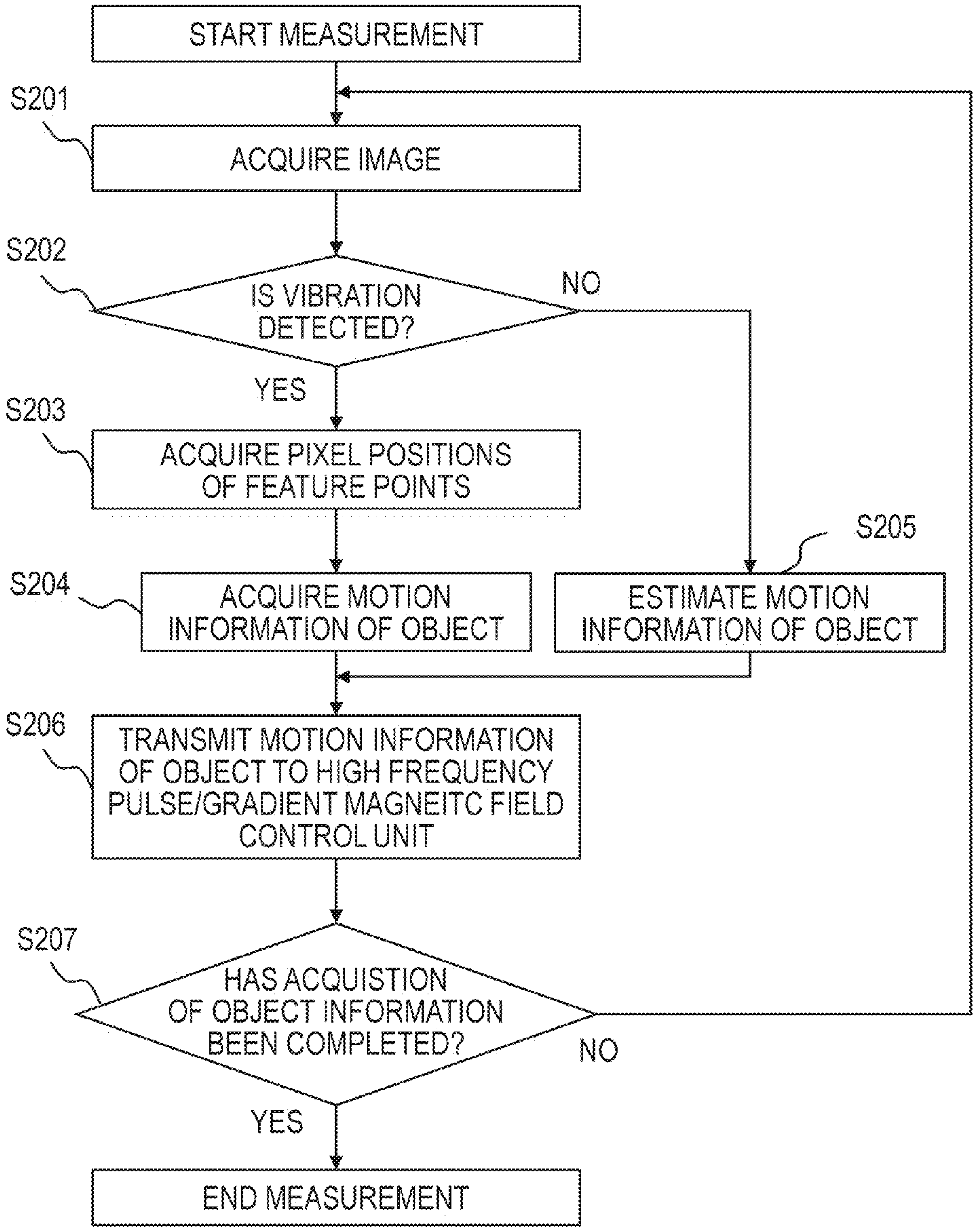
FIG. 10 is a flowchart illustrating an example of the measurement processing according to the second embodiment.

Processing of the tracking system 300 will be described with reference to FIGS. 9 and 10. FIG. 9 is a view illustrating a configuration example of the tracking system 300 according to the second embodiment. The tracking system 300 includes the imaging unit 21, the image processing unit 22, the body motion acquisition unit 23, and the output unit 25. Description of the same components as those of the tracking system 300 according to the first embodiment will be omitted. The tracking system 300 measures the motion of the object, and outputs the motion information of the object to the high frequency pulse/gradient magnetic field control unit 10.

In the second embodiment, the image processing unit 22 includes the index acquisition unit 221 and the feature point detection unit 223. The body motion acquisition unit 23 includes a motion measurement unit 231 and a motion estimation unit 232. Details of processing of the index acquisition unit 221, the feature point detection unit 223, the motion measurement unit 231, and the motion estimation unit 232 will be described together with processing in a flowchart illustrated in FIG. 10. FIG. 10 is the flowchart illustrating an example of measurement processing according to the second embodiment.

In step S201, the imaging unit 21 acquires an image of the object, and transmits the image to the image processing unit 22. Furthermore, the imaging apparatus 100 starts acquiring object information (imaging processing of the object).

In step S202, the index acquisition unit 221 detects vibration from the image acquired in step S201, and acquires an index which reflects the vibration. The index acquisition unit 221 can detect the vibration by the method similar to that in step S102 according to the first embodiment. In the case where there is the vibration, the processing proceeds to step S205, and, in a case where there is no vibration, the processing proceeds to step S203.

In step S203, the feature point detection unit 223 acquires pixel positions of feature points from the image acquired by the imaging unit 21. The feature point detection unit 223 may use any method such as image binarization, intersection calculation, contour extraction, center-of-gravity calculation, and pattern matching as long as the method can acquire the pixel positions of the feature points.

In step S204, the motion measurement unit 231 acquires the motion information of the object on the basis of the pixel positions of the feature points acquired in step S203 similar to the body motion acquisition unit 23 according to the first embodiment.

In step S205, the motion estimation unit 232 does not acquire the motion information of the object from the image acquired by the imaging unit 21, and estimates current motion information of the object from motion information of the object acquired in the past. For example, the motion estimation unit 232 interpolates a value of the past motion information of the object, and estimates a value of the current motion information of the object. Examples of an interpolation method include linear interpolation, curve interpolation, spline interpolation, Lanczos interpolation, and sinc interpolation methods. Furthermore, the motion estimation unit 232 may use a prior estimation value of a Kalman filter. Furthermore, by applying to the Kalman filter a model which is based on relevance of a plurality of degrees of freedom, the motion estimation unit 232 may improve estimation accuracy compared to a case where interpolation is performed per degree of freedom. Furthermore, the motion estimation unit 232 may use a posterior estimate value of the Kalman filter. In this case, the motion estimation unit 232 acquires the motion information of the object and inputs the motion information to the Kalman filter even when it is determined in step S202 that there is vibration. True value estimation capability of the Kalman filter makes it possible to reduce an error of the motion information of the object. The motion estimation unit 232 may use an enhanced Kalman filter, an outlier elimination Kalman filter, a particle filter, or the like in addition to a normal Kalman filter.

Figure 11:
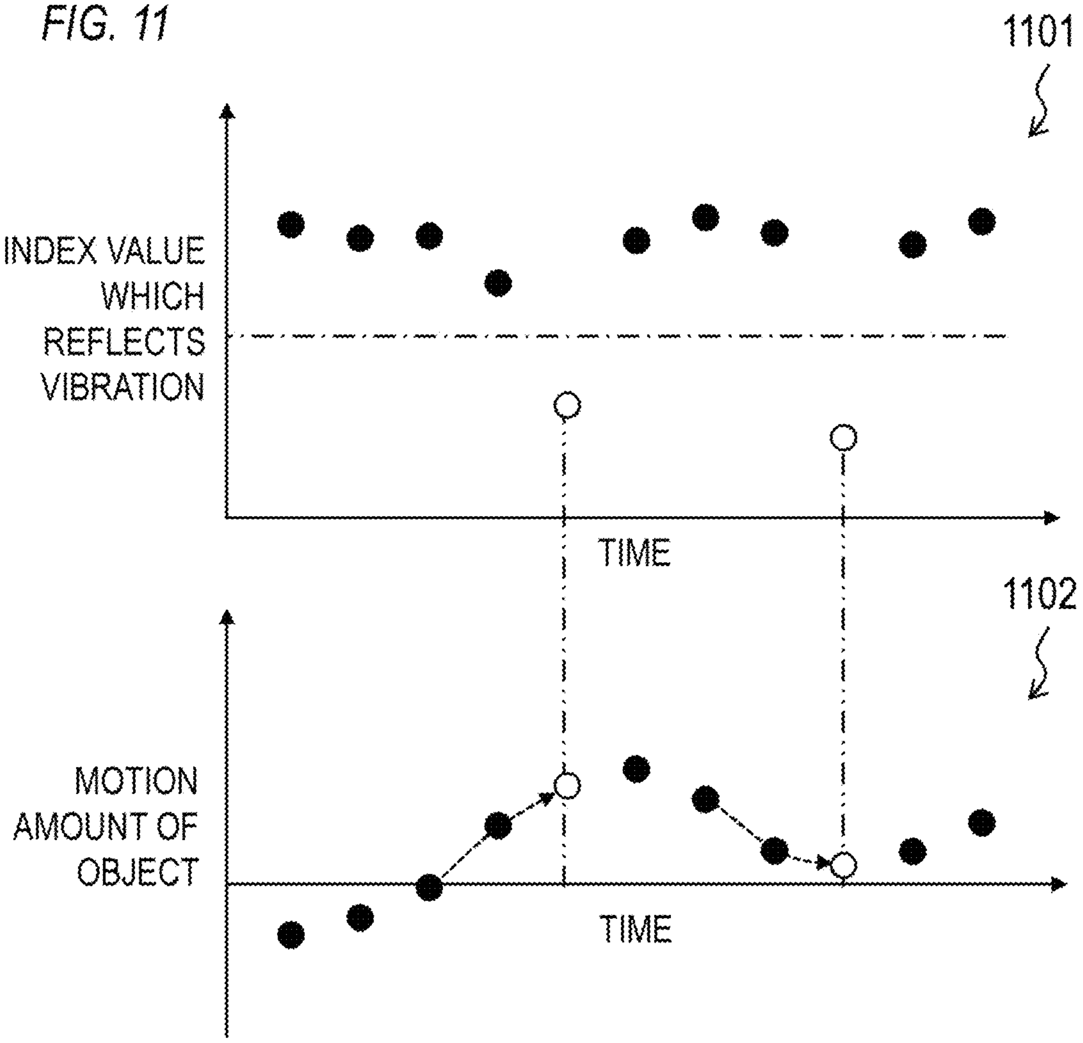
FIG. 11 is a view for describing determination on whether or not there is vibration based on the index which reflects the vibration.

FIG. 11 is a view for describing determination on whether or not there is vibration based on the index which reflects vibration. A graph 1101 in FIG. 11 is a graph schematically showing a change in an index value which reflects vibration, and, as the index value is smaller, the vibration is greater. The body motion acquisition unit 23 determines that there is vibration in a case where the index value is equal to or less than a threshold indicated by a dashed line (white circles), and determines that there is no vibration in a case where the index value exceeds the threshold (black circles).

A graph 1102 in FIG. 11 is a graph schematically showing a change in a motion amount of the object. The black circles indicate the motion amount of the object measured in step S201 to step S204, and the white circles indicate the motion amount of the object estimated in step S205. Broken line arrows in the graph 1102 indicate that the motion estimation unit 232 estimates from the motion amount of the object at two past different times the motion amount of the object at a time at which it is determined that there is vibration.

The motion estimation unit 232 may estimate the motion amount of the object at a time at which it is determined that there is vibration using the motion amount of the object acquired not only at two past different times, but also at three or more different times. By increasing the number of past motion amounts of the object used for estimation, the motion estimation unit 232 can improve estimation accuracy. Furthermore, in a case where Retrospective Motion Correction is performed, the motion estimation unit 232 may use the motion amount of the object at a future time of an estimation target time in addition to a past time.

In step S206, the body motion acquisition unit 23 transmits the motion information of the object acquired in step S204 or step S205 to the high frequency pulse/gradient magnetic field control unit 10. The high frequency pulse/gradient magnetic field control unit 10 controls the gradient magnetic fields on the basis of the motion information of the object, and performs measurement for acquiring object information while correcting the motion of the object. Furthermore, the body motion acquisition unit 23 may acquire the motion information of the object, and then correct the object information by Retrospective Motion Correction.

In step S207, the tracking system 300 determines whether or not the imaging apparatus 100 has completed acquiring the object information. When, for example, the imaging unit 21 stops acquiring an image according to an instruction of a user, the tracking system 300 can determine that acquisition of the object information has been completed. In a case where acquisition of the object information is not completed, the tracking system 300 repeatedly executes the processing in step S201 to step S207. In a case where acquisition of the object information has been completed, the tracking system 300 finishes the measurement processing illustrated in FIG. 10.

According to the above second embodiment, the imaging apparatus 100 can accurately acquire the motion of the object even when the imaging apparatus 100 vibrates. The imaging apparatus 100 according to the second embodiment is useful in a case where, for example, a motion blur of an image is not sufficiently corrected due to the vibration of the imaging apparatus 100, and it is difficult to detect feature points. Note that the imaging apparatus 100 may correct the image and measure the motion information of the object in a case where the motion blur can be corrected by combining the first embodiment and the second embodiment, and estimate the motion information of the object in a case where it is difficult to correct the motion blur. By, for example, performing control such as correction of the gradient magnetic fields or performing image reconstruction on the basis of the acquired motion information of the object, the imaging apparatus 100 can obtain a quality image with a less artifact. The second embodiment is not limited to the above example, and processing of acquiring the motion information of the object is also applicable to any aspect executed on the basis of the index which reflects vibration.

Third Embodiment

The third embodiment will be described. The third embodiment is an embodiment where part of information of an object imaged and acquired by the imaging apparatus 100 is estimated on the basis of a vibration amount of the imaging apparatus 100. The imaging apparatus 100 performs image reconstruction by excluding wavenumber components acquired at the substantially same times as times at which the vibration amounts become larger than a threshold, and estimating the excluded wavenumber components.

In the third embodiment, when the imaging apparatus 100 images the head of the human subject, the tracking system 300 measures the motion of the head, and corrects imaging conditions of magnetic resonance imaging according to the motion of the head. The imaging apparatus 100 acquires the index which reflects vibration of the imaging apparatus 100, and reconstructs the image on the basis of the acquired index. The head of the human subject corresponds to an "object". Note that the object is not limited to the head, and may be other parts of the body of the human subject or may be the entire body of the human subject. Furthermore, the object is not limited to a human body, and may be other biological bodies such as animals.

The components of the imaging apparatus 100 according to the third embodiment other than the image processing unit 22 and a reconstruction unit 11*h* are the same as those of the imaging apparatus 100 according to the first embodiment. Description of the same components as those of the imaging apparatus 100 according to the first embodiment will be omitted.

Figure 12:
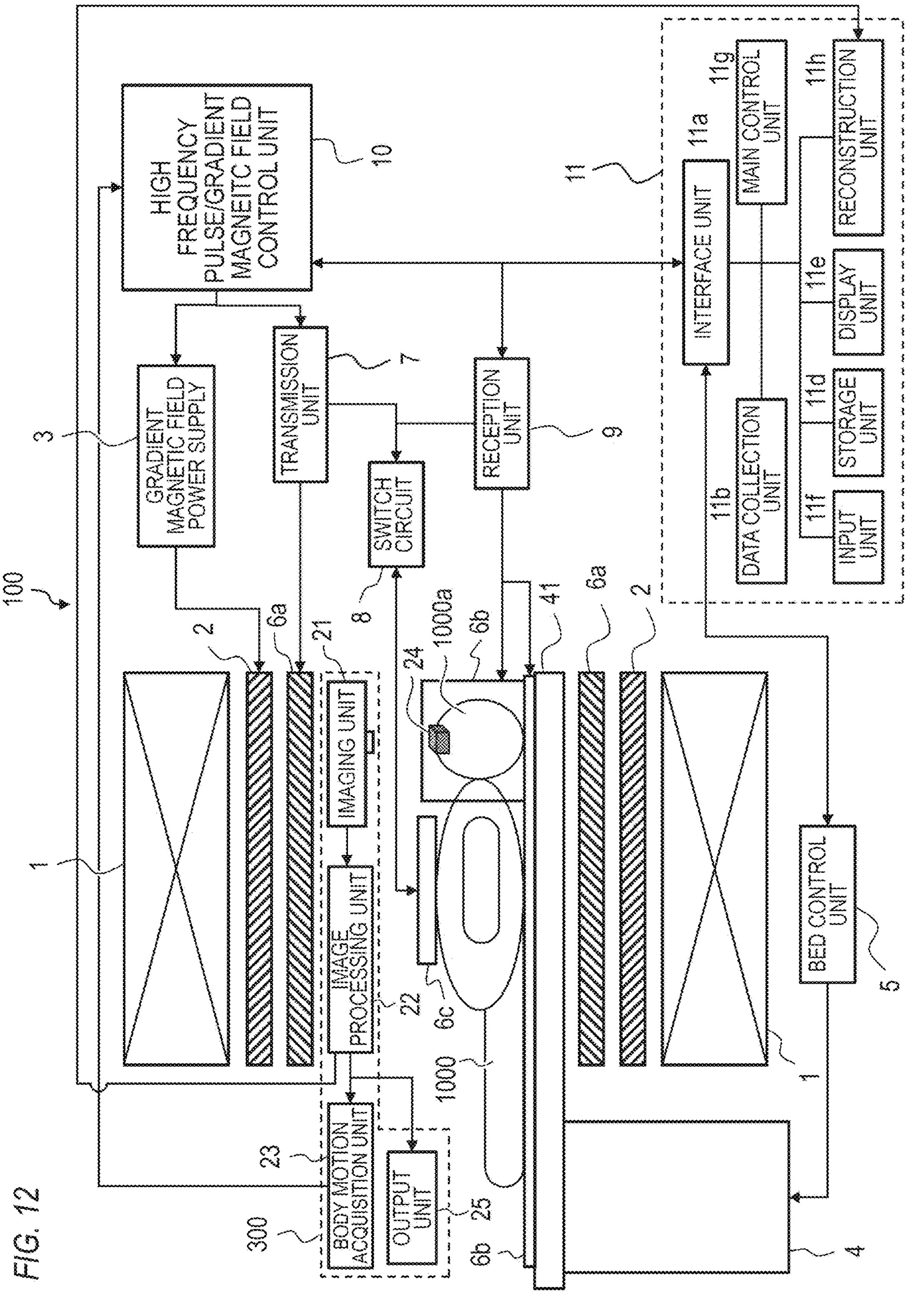
FIG. 12 is a view illustrating a configuration example of the magnetic resonance imaging apparatus according to a third embodiment.

FIG. 12 is a view illustrating a configuration example of the imaging apparatus 100 according to the third embodiment. The index acquisition unit 221 of the image processing unit 22 according to the third embodiment transmits to the reconstruction unit 11*h* the vibration amount which is an index which reflects vibration of the imaging apparatus 100.

Figure 13:
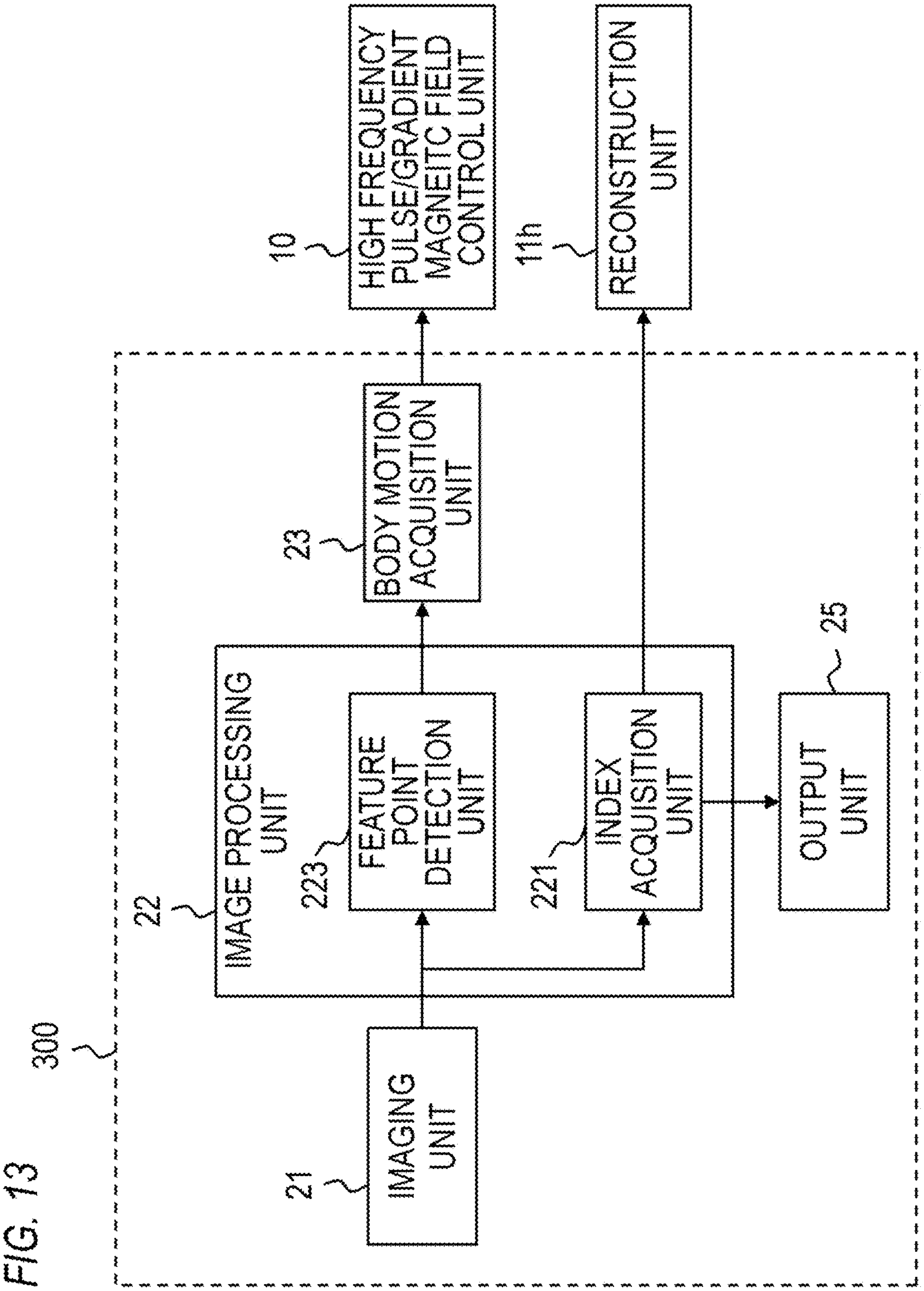
FIG. 13 is a view illustrating a configuration example of the tracking system according to the third embodiment.
Figure 14:
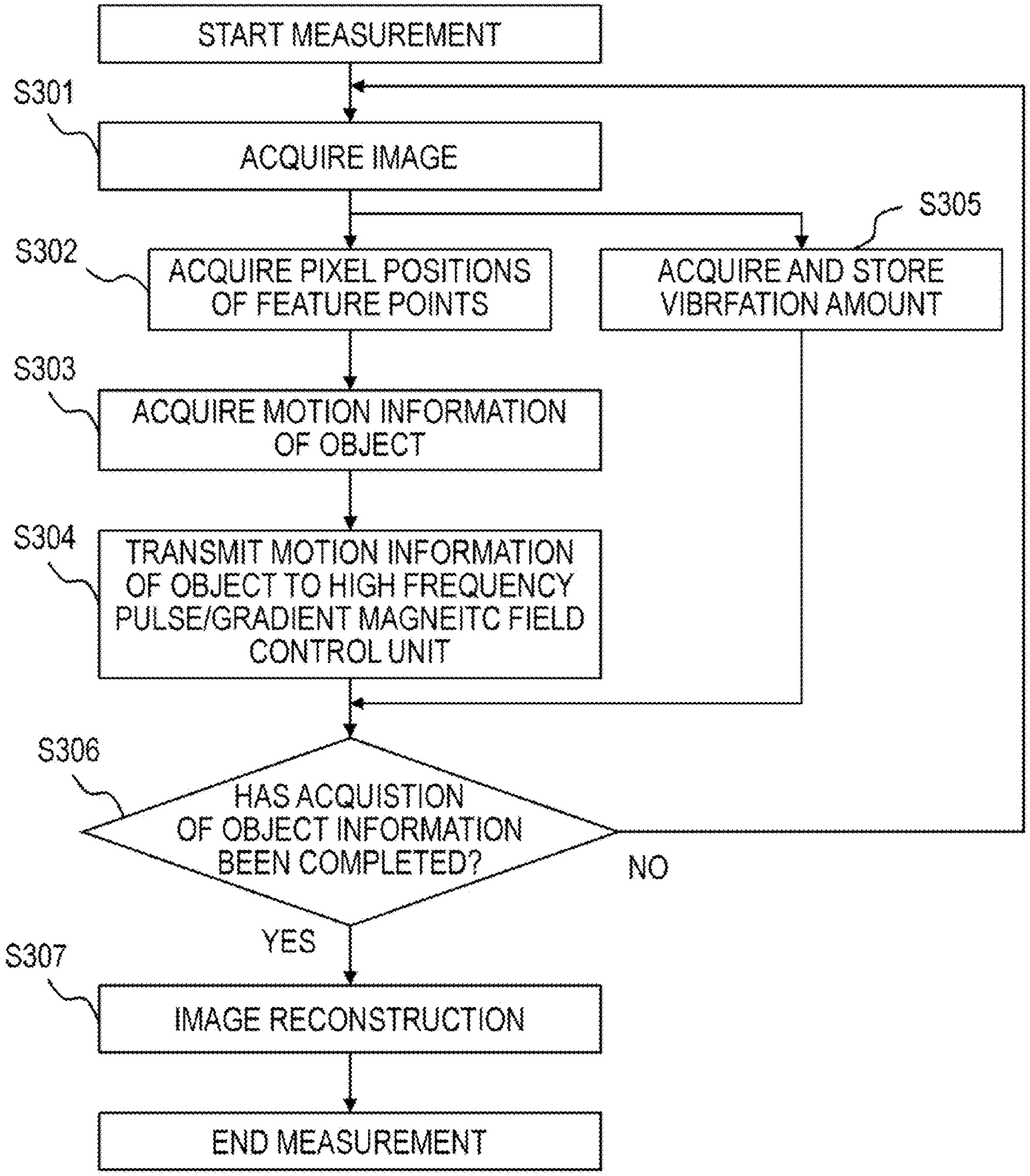
FIG. 14 is a flowchart illustrating an example of the measurement processing according to the third embodiment.

Processing of the tracking system 300 and the reconstruction unit 11*h* will be described with reference to FIGS. 13 and 14. FIG. 13 is a view illustrating a configuration example of the tracking system 300 according to the third embodiment. The tracking system 300 includes the imaging unit 21, the image processing unit 22, the body motion acquisition unit 23, and the output unit 25. Description of the same components as those of the tracking system 300 according to the first embodiment will be omitted. The tracking system 300 measures the motion of the object, and outputs the motion information of the object to the high frequency pulse/gradient magnetic field control unit 10. Furthermore, the tracking system 300 acquires the index which reflects the vibration of the imaging apparatus 100, and outputs the acquired index to the reconstruction unit 11*h*.

In the third embodiment, the image processing unit 22 includes the index acquisition unit 221 and the feature point detection unit 223. Details of processing of the index acquisition unit 221 and the feature point detection unit 223 will be described together with processing in a flowchart illustrated in FIG. 14. FIG. 14 is the flowchart illustrating an example of measurement processing according to the third embodiment.

In step S301, the imaging unit 21 acquires an image of the object, and transmits the image to the image processing unit 22. Furthermore, the imaging apparatus 100 starts acquiring object information (imaging processing of the object).

In step S302, the feature point detection unit 223 acquires pixel positions of feature points from the image acquired by the imaging unit 21. The feature point detection unit 223 may use any method such as image binarization, intersection calculation, contour extraction, center-of-gravity calculation, and pattern matching as long as the method can acquire the pixel positions of the feature points.

In step S303, the body motion acquisition unit 23 acquires the motion information of the object on the basis of the pixel positions of the feature points acquired in step S302. In step S304, the body motion acquisition unit 23 transmits the motion information of the object acquired in step S303 to the high frequency pulse/gradient magnetic field control unit 10. The high frequency pulse/gradient magnetic field control unit 10 controls gradient magnetic fields on the basis of the motion information of the object. The imaging apparatus 100 performs measurement for acquiring object information while the high frequency pulse/gradient magnetic field control unit 10 corrects the motion of the object. Furthermore, the imaging apparatus 100 may acquire the motion information of the object, and then correct the object information by Retrospective Motion Correction.

In step S305, the index acquisition unit 221 acquires the vibration amount from the image acquired in step S301. The method described with reference to step S102 in the first embodiment can be used to acquire the vibration amount. The index acquisition unit 221 stores the acquired vibration amount in the storage unit such as a memory. The vibration amount is an example of the index which reflects vibration. The index which reflects the vibration may be any index as long as the index is, for example, a binary value indicating a vibration amplitude or whether or not there is vibration, and reflects vibration.

In step S306, the tracking system 300 determines whether or not the imaging apparatus 100 has completed acquiring the object information. When, for example, the imaging unit 21 stops acquiring an image according to an instruction of a user, the tracking system 300 can determine that acquisition of the object information has been completed. In a case where acquisition of the object information is not completed, the tracking system 300 repeatedly executes step S301 to step S306. By repeatedly executing the processing in step S305, the tracking system 300 can acquire chronological order information of the vibration amount. In a case where acquisition of the object information has been completed, the tracking system 300 finishes the measurement processing illustrated in FIG. 14.

Figure 15B:
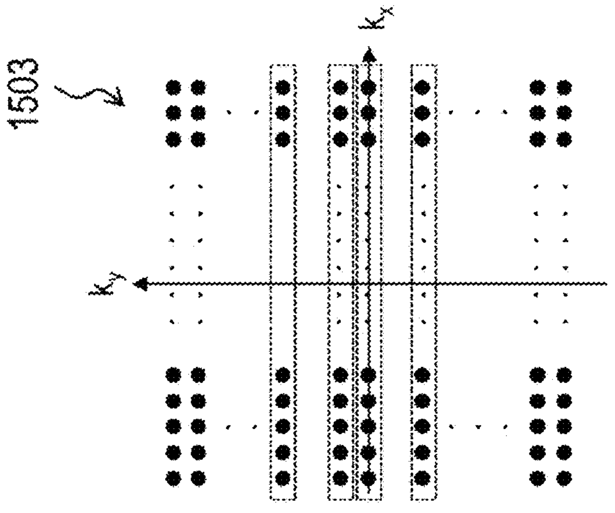
FIGS. 15A and 15B are views for describing image reconstruction based on a vibration amount.

In step S307, the reconstruction unit 11*h* performs image reconstruction using the vibration amount acquired in step S306. Image reconstruction based on the vibration amount will be described with reference to FIGS. 15A and 15B. A graph 1501 in FIG. 15A indicates the chronological order information of the vibration amount. Black circles and white circles indicate vibration amounts at respective times. Vibration amounts larger than a threshold indicated by a dashed line are indicated by the white circles, and vibration amounts equal to or less than the threshold are indicated by the black circles.

Figure 15A:
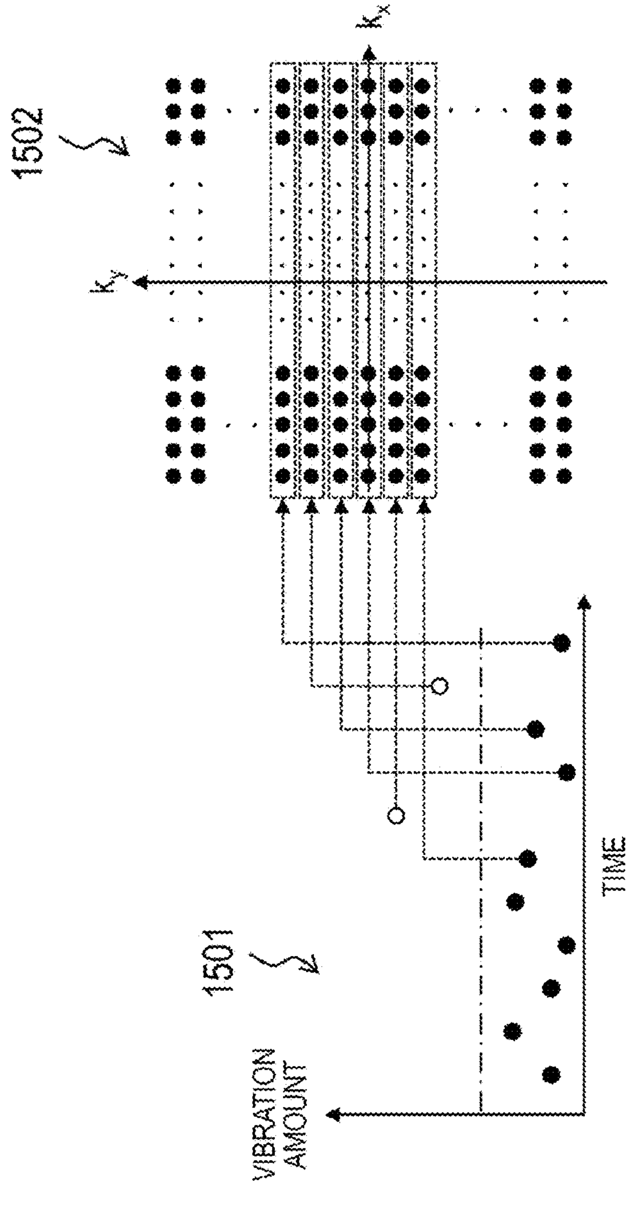

A distribution map 1502 in FIG. 15A indicates a wavenumber component distribution or a spatial frequency component distribution of an object image which is the object information acquired by the imaging apparatus 100. A horizontal axis $k_x$ and a vertical axis $k_y$ correspond to a wavenumber in an x axis direction and a wavenumber in a y axis direction in FIG. 3A. The black circle indicates each acquired wavenumber component. The vibration amounts in the graph 1501 and the wavenumber components in broken line frames in the distribution map 1502 connected by broken line arrows indicate that the vibration amounts and the wavenumber components have been acquired at the substantially same time. Note that the vibration amount and the wavenumber component may not necessarily be associated on a one-to-one basis, but a vibration amount at a certain time may be associated with wavenumber components in a plurality of broken line frames acquired at the substantially same time.

The reconstruction unit 11*h* performs image reconstruction using a wavenumber component distribution of a distribution map 1503 in FIG. 15C obtained by excluding wavenumber components acquired at the substantially same times as times at which the vibration amounts are equal or more than the threshold. The reconstruction unit 11*h* estimates a wavenumber component of a portion excluded in the distribution map 1503. For example, the reconstruction unit 11*h* can interpolate the wavenumber component using compressed sensing, estimation by the machine learning circuit, interpolation in a wavenumber space, or the like. The reconstruction unit 11*h* performs image reconstruction using the interpolated wavenumber component distribution. When the reconstruction unit 11*h* completes the image reconstruction, the measurement processing illustrated in FIG. 14 is finished.

According to the above third embodiment, by excluding and estimating the wavenumber components acquired at the substantially same times as the times at which the vibration amounts become larger than the threshold, the imaging apparatus 100 can reduce an influence of a correction error of the gradient magnetic fields. Consequently, even when an error of the motion information of the object becomes significant due to vibration of the apparatus, and the correction error of the gradient magnetic fields becomes significant, the imaging apparatus 100 can reduce an influence of the correction error, and obtain a high quality image with a less artifact. The third embodiment is not limited to the above example, and is also applicable to any aspect where image reconstruction is executed on the basis of the index which reflects vibration.

The present invention has been described in detail on the basis of the preferred embodiments of the present invention. However, the present invention is not limited to these specific embodiments, and also covers various embodiments without departing from the gist of the present invention. Furthermore, each of the above embodiments merely describes one embodiment of the present invention, and various embodiment can be also combined as appropriate.

According to the present invention, it is possible to reduce an influence of vibration of the apparatus, and accurately measure a motion of an object.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-036490, filed on Mar. 9, 2023, which is hereby incorporated by reference herein in its entirety.

What is claimed is:

1. An object motion measurement apparatus comprising:

at least one memory and at least one processor configured to:

acquire, from an image imaged by an imaging device which images an object, an index which reflects vibration of an imaging apparatus, which is different from the imaging device and images the object;

execute image processing on the image based on the index, wherein the image processing is processing of reducing, based on the index, a motion blur produced in the image by the vibration; and acquire information related to a motion of the object from the image to which the image processing has been applied.

2. The object motion measurement apparatus according to claim 1, wherein the imaging apparatus executes imaging processing based on the index.

3. The object motion measurement apparatus according to claim 1, wherein the imaging device is an optical imaging device, and the imaging apparatus is a medical image imaging apparatus.

4. The object motion measurement apparatus according to claim 1, wherein the index is acquired based on an amplitude of the vibration.

5. The object motion measurement apparatus according to claim 4, wherein the index is a point spread function (PSF) of the image in which a motion blur has been produced by the vibration.

6. The object motion measurement apparatus according to claim 5, wherein the point spread function is acquired using a first image imaged by the imaging device, and a second image imaged by the imaging device in a state where the vibration is less than the vibration in the first image.

7. The object motion measurement apparatus according to claim 1, wherein the image processing is processing of reducing the motion blur by deconvolution based on the index.

8. The object motion measurement apparatus according to claim 1, wherein the image processing on the image is changed based on the index.

9. The object motion measurement apparatus according to claim 8, wherein a change of the image processing is a change of a threshold of binarization processing of the image.

10. The object motion measurement apparatus according to claim 9, wherein the information related to the motion of the object is acquired using an image generated by changing the image processing.

11. The object motion measurement apparatus according to claim 1, wherein a method for acquiring the information related to the motion of the object is changed based on the index.

12. The object motion measurement apparatus according to claim 1, wherein the imaging apparatus changes an imaging condition based on the index.

13. The object motion measurement apparatus according to claim 12, wherein the imaging apparatus estimates, based on the index, part of information of the object to be acquired by imaging with the imaging apparatus.

14. The object motion measurement apparatus according to claim 1, wherein information of a motion of a head of a person is acquired as the information related to the motion of the object.

15. An imaging apparatus comprising:

the object motion measurement apparatus according to claim 1; and at least one memory and at least one processor configured to execute processing which uses the information related to the motion of the object that is output from the object motion measurement apparatus.

16. The imaging apparatus according to claim 15, wherein an image of the object is reconstructed using the information related to the motion of the object.

17. The object motion measurement apparatus according to claim 1, wherein the at least one memory and the at least one processor is further configured to:

compare the index with a threshold, and determine, based on a result of comparing the index with the threshold, whether to estimate the information related to the motion of the object.

18. An object motion measurement method comprising:

acquiring, from an image imaged by an imaging device which images an object, an index which reflects vibration of an imaging apparatus, which is different from the imaging device and images the object;

executing image processing on the image based on the index, wherein the image processing is processing of reducing, based on the index, a motion blur produced in the image by the vibration; and acquiring information related to a motion of the object from the image to which the image processing has been applied.

19. A non-transitory computer-readable medium that stores a program for causing a computer to execute an object motion measurement method comprising:

acquiring, from an image imaged by an imaging device which images an object, an index which reflects vibration of an imaging apparatus, which is different from the imaging device and images the object;

executing image processing on the image based on the index, wherein the image processing is processing of reducing, based on the index, a motion blur produced in the image by the vibration; and acquiring information related to a motion of the object from the image to which the image processing has been applied.

* * * * *